Figure 15:
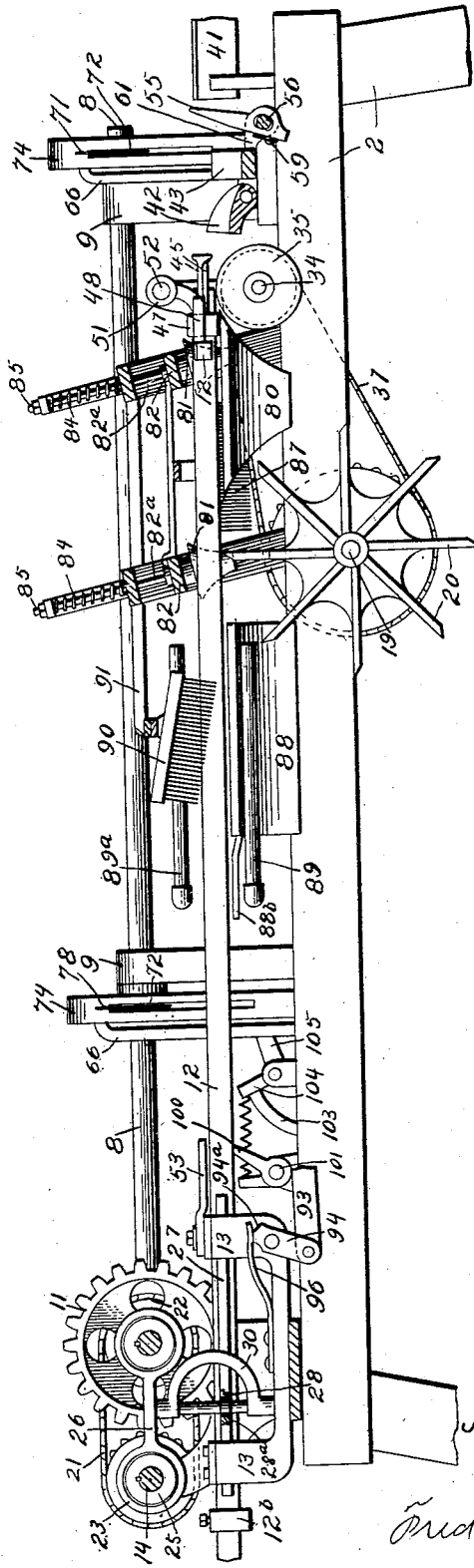

No. 738,111. PATENTED SEPT. 1, 1903.
J. KELLINGTON.
FISH CLEANING MACHINE.
APPLICATION FILED MAY 6, 1902.
NO MODEL. 6 SHEETS—SHEET 1.
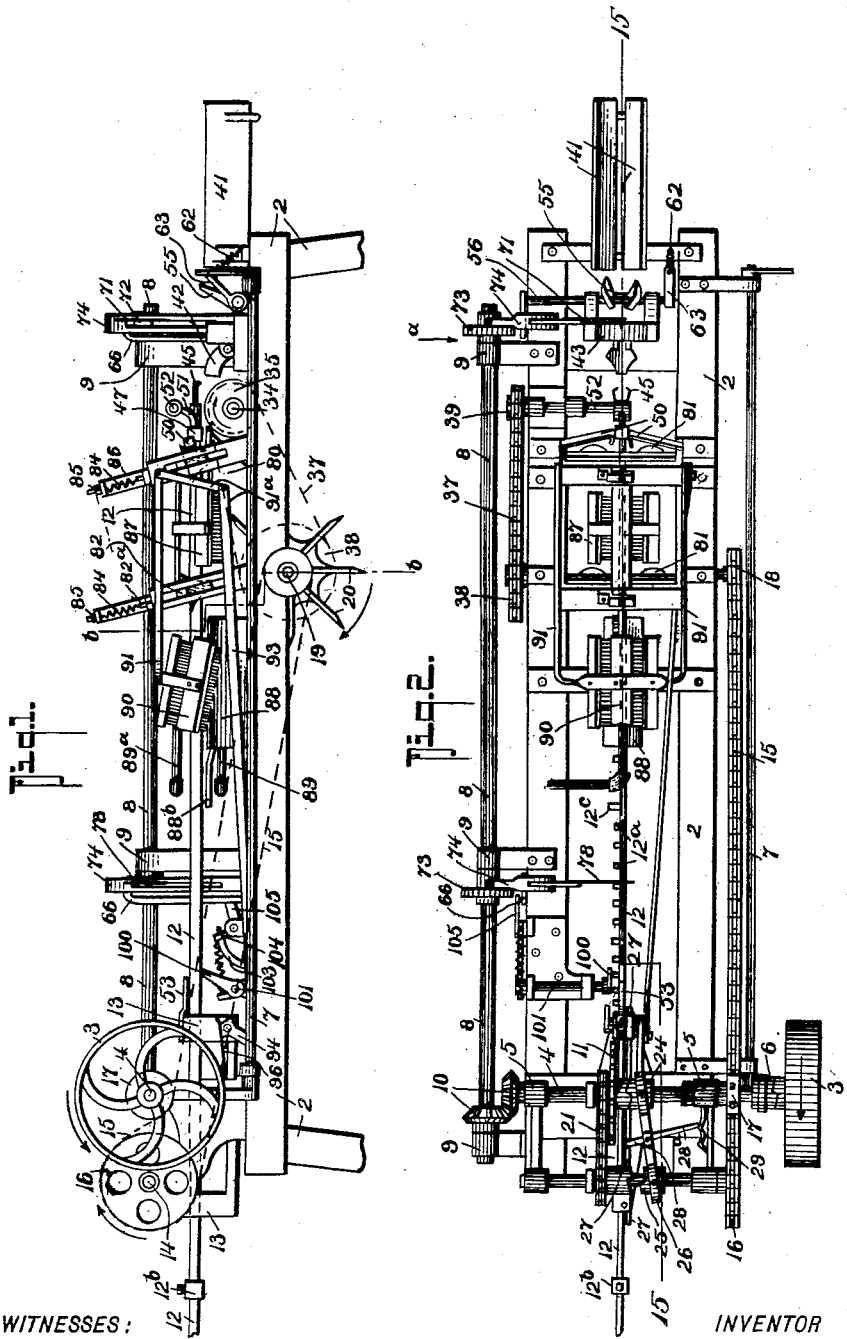
WITNESSES:
INVENTOR
John Kellington
BY
Fred G. Dieterich
ATTORNEY

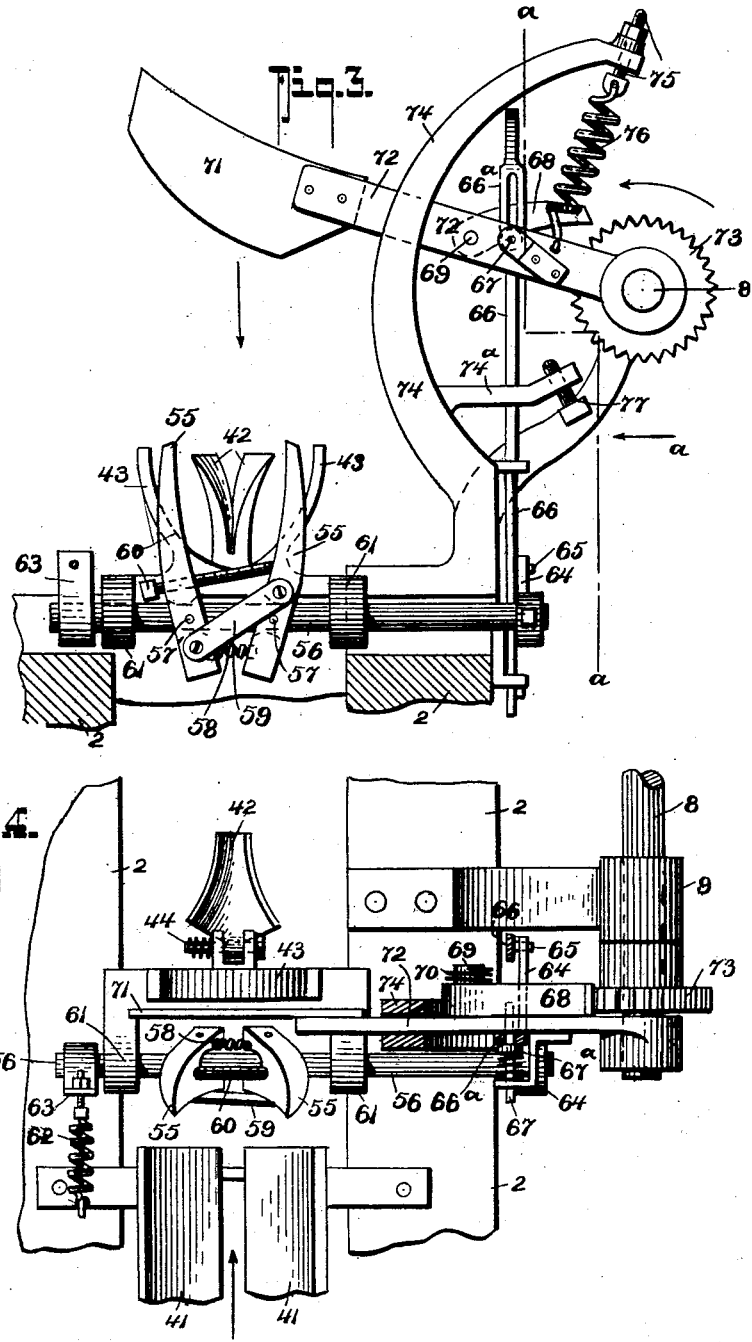

No. 738,111. PATENTED SEPT. 1, 1903.
J. KELLINGTON.
FISH CLEANING MACHINE.
APPLICATION FILED MAY 6, 1902.
NO MODEL. 6 SHEETS—SHEET 3.
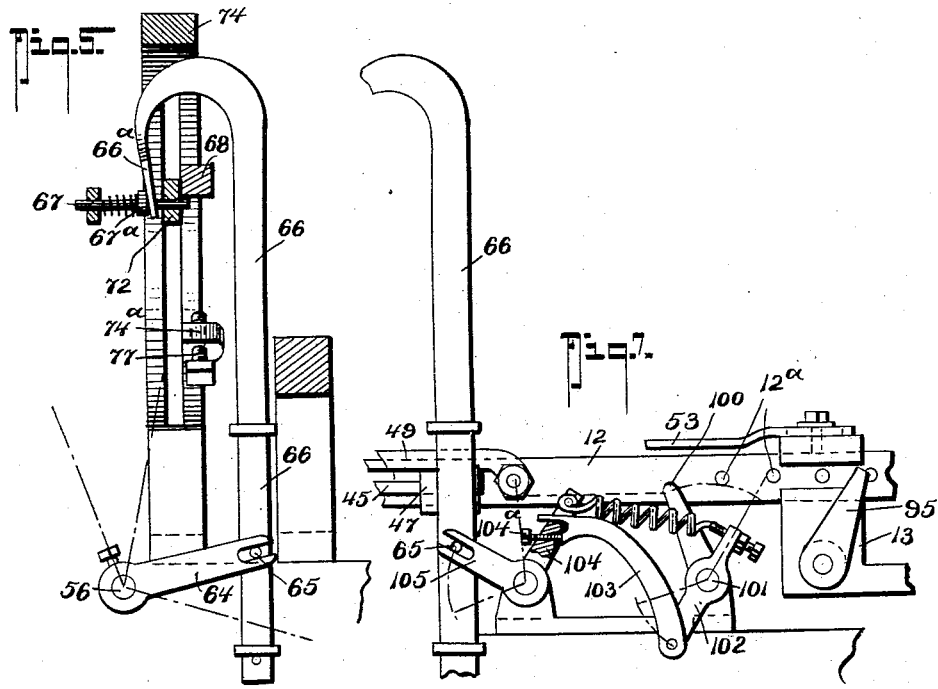
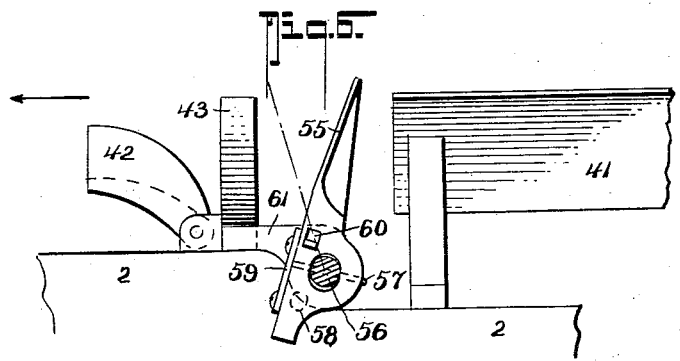
WITNESSES:
INVENTOR
John Kellington.
BY
Fred G. Dieterich
ATTORNEY

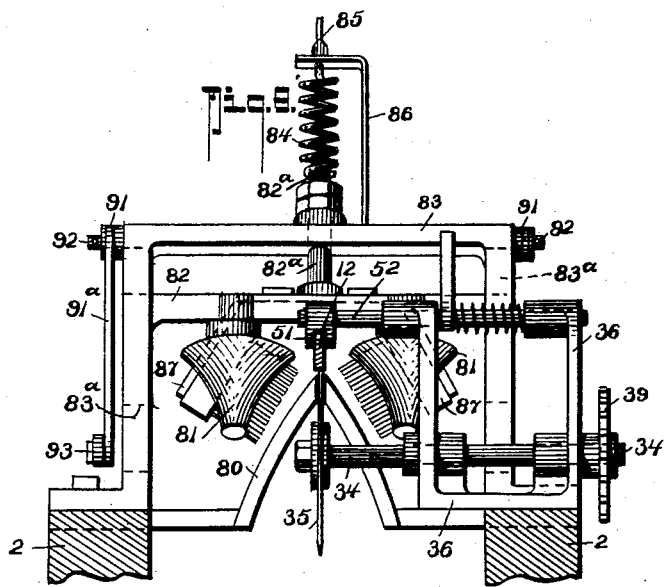
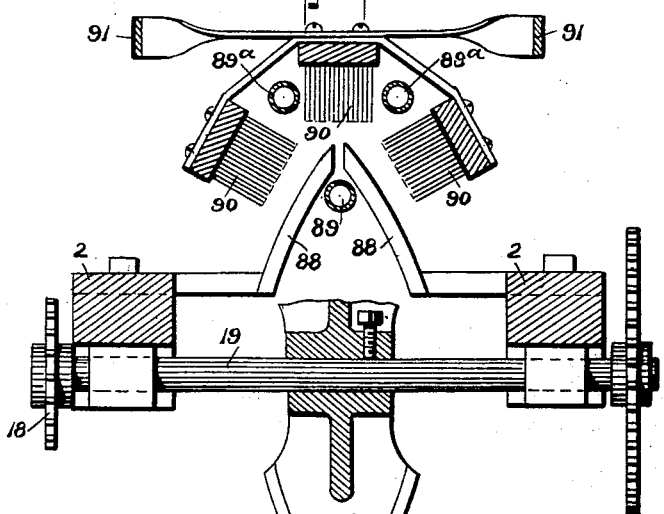
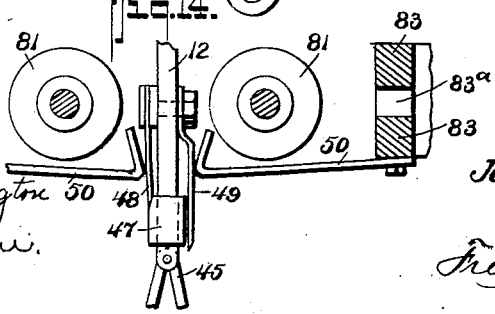

No. 738,111. PATENTED SEPT. 1, 1903.
J. KELLINGTON.
FISH CLEANING MACHINE.
APPLICATION FILED MAY 6, 1902.
NO MODEL. 6 SHEETS—SHEET 5.
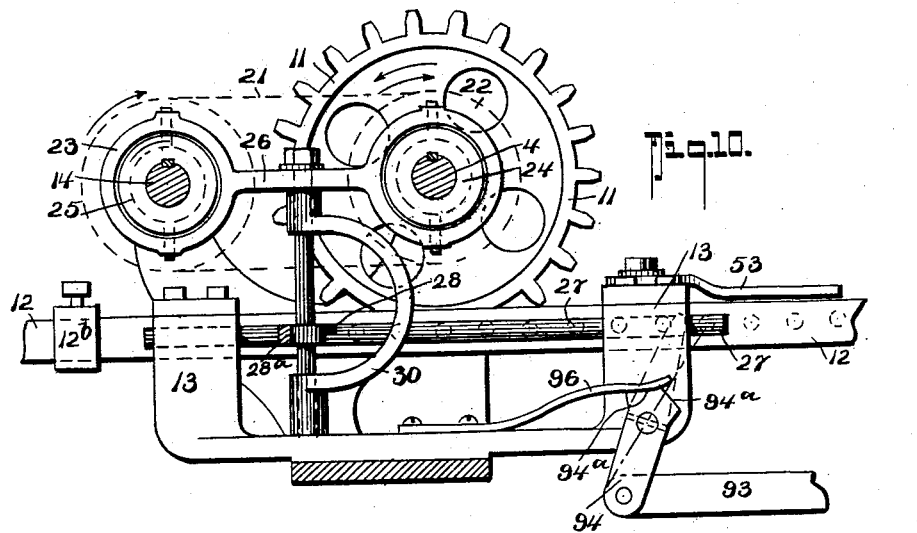
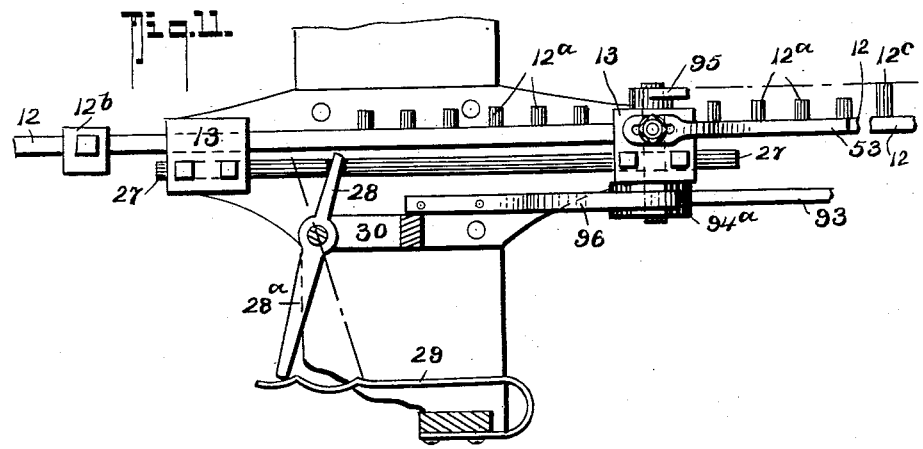
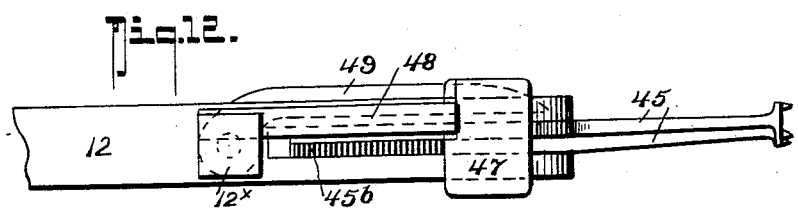
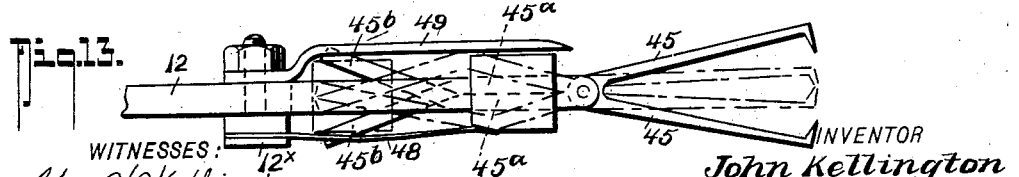
WITNESSES:
Guy V. Worthington
Lee B. Kenion
INVENTOR
John Kellington
BY
Fred G. Dieterich
ATTORNEY No. 738,111. PATENTED SEPT. 1, 1903.
J. KELLINGTON.
FISH CLEANING MACHINE.
APPLICATION FILED MAY 6, 1902.
NO MODEL. 6 SHEETS—SHEET 6.

WITNESSES:
F. C. Gibson.
John T. Schrott

INVENTOR
John Kellington.
BY
Fred G. Dieterich
ATTORNEY

No. 738,111. Patented September 1, 1903.

UNITED STATES PATENT OFFICE.

JOHN KELLINGTON, OF NEW WESTMINSTER, CANADA, ASSIGNOR OF ONE-HALF TO DANIEL JAMES MUNN AND ALEXANDER EWEN, OF NEW WESTMINSTER, CANADA.

FISH-CLEANING MACHINE.

SPECIFICATION forming part of Letters Patent No. 738,111, dated September 1, 1903.

Application filed May 6, 1902. Serial No. 106,154. (No model.)

*To all whom it may concern:*

Be it known that I, JOHN KELLINGTON, a citizen of the Dominion of Canada, residing at New Westminster, in the Province of British Columbia, Canada, have invented a new and useful Fish-Cleaning Machine, of which the following is a specification.

My invention relates to a machine for cleaning fish, and is designed to effect the various operations required while the fish is drawn through the machine suspended from the pulling-bar and sustained by the principal operating parts instead of being supported in a trough or channel or on a chain, as has been the usual practice heretofore.

The machine is fully described in the following specification and illustrated by its accompanying drawings, in which—

Figure 1 is a side elevation; Fig. 2, a plan; Fig. 3, a detail end elevation of the mechanism which operates the head-cutting knife and of its adjacent parts; Fig. 4, a plan of the same; Fig. 5, a side elevation and part section on $a\ a$ in Fig. 3 of the mechanism by which the knife-gear is brought into action looking in the direction of the arrow $a$ in Figs. 2 and 3; Fig. 6, a detail of the gill-lever, cutting-rest, and tail-guide; Fig. 7, a side elevation of the trip mechanism which operates the tail-knife; Fig. 8, an end elevation showing the relation of the splitting-knife and spreader, with the rollers and their frame, which maintain the desired position of the fish as it passes through the cleaning-brushes and over the gutting-wheel. Fig. 9 is a cross-section and end elevation on the line $b\ b$ in Fig. 1, showing the gutting-wheel, scaling-brushes, and their spray-pipes. Figs. 10 and 11 are details in elevation and plan of the hauling-bar slide, the reversing-gear, and the lever mechanism which lifts the brushes clear of the bar during its return stroke and brings them down while the fish is passing under; Figs. 12 and 13, details in elevation and plan of the tail-grip, and Fig. 14 a detail of the guideway which directs the bar between the sleeve-operating levers. Fig. 15 is a vertical longitudinal section taken practically on the line 15 15 of Fig. 2.

I will first describe the operation of the machine in general terms, that the subsequent description may be easier followed and understood.

The fish are first placed in the receiving-cradle 41 (shown at the right-hand end of the drawings in Figs. 1 and 2) tail first and belly down, and the tail is entered into the tail-guide 42, which sustains it with the fluke or flat of the tail in a vertical line. It is there taken hold of by the automatically-operated grip 45 at the end of the hauling-bar 12, which bar is slidable through the length of the machine and is actuated to pull the fish through the cleaning-gear by the mechanism shown at the left-hand side. In being drawn forward the fish passes first over the revolving splitting-knife 35, and the gills engage the gill-levers 55, which bring the head-knife into operation, and the head is severed. Further progress of the fish over the splitting-knife 35 and the spreader 80 next to it (see Fig. 8) brings it under the influence of the rollers 81, which keep it in proper position, back up, on the spreader and maintain a yielding pressure on it as it passes over the revolving gutting-wheel 20, which removes the viscera, the fish being simultaneously brushed to remove the scales. After passing the gutting-wheel 20 the fish passes over a second spreader 88, through the top ridge of which a spray of water under high pressure is discharged from the pipe 89, and the wire scrubbing-brushes 90 are pressed down on the back and both sides of the fish, while a strong spray of water is also played on the outside from the pipes 89$^a$. This completes the cleaning process, and the fish is drawn forward until the tail-knife 78 is tripped, the tail severed, and the fish drops into a suitable chute for conveyance from the machine, while the tail-grip 45 is automatically opened and the mechanism reversed, the bar being run back at an increased speed for another fish.

The detailed description of the operating mechanism is as follows:

The machine is supported at a suitable height for operating on a framework 2, and at the head of the machine is the loose belt-pulley 3 on a shaft 4, rotatable in bearings 5, and slidable on a feather-key adjacent to the pulley is the clutch 6 to disengage the machine operated by a rod 7 and suitable levers from the right-hand end to be convenient for the attendant. At the back of the machine is a shaft 8, supported in bearings 9 and driven from the shaft 4 by the bevel-wheels 10. This shaft operates the head and tail cutting knives in a manner to be described later. Toward the center of the shaft 4 and loose on it is a cog-wheel 11, adapted to engage and operate the hauling-bar 12 by means of the pins 12$^a$ in its side, forming a rack. This bar is slidable in the guides 13, secured to the frame of the machine, the guides being open on one side to permit the passage of the pins. Parallel to the shaft 4 is a similar cross-shaft 14, which is driven from 4 at a lower rate of speed by the chain 15, which passing over the chain-wheel 16, secured to the shaft 14, passes under a smaller chain-wheel 17, secured to the shaft 4, and passing around the chain-wheel 18 on a shaft 19 drives the gutting-wheel 20. By this drive system the shaft 14 is driven from 4 in an opposite direction and at a lower rate of speed, as it is the shaft which effects the hauling of fish through the machine, while 4 drives the bar during the return stroke. The cog-wheel 11 is connected with the shaft 14 by a chain 21, passing around a chain-wheel 22, attached to or integral with the cog-wheel 11 on the shaft 4 and the chain-wheel 23, free on the shaft 14. The system of the cog-wheel and its attached chain-wheel on the shaft 4 and the chain-wheel on the shaft 14 are thus free on their shafts and may be driven from either shaft by the clutches 24 and 25, slidable on feather-keys in 4 and 14, respectively, either of which clutches may be brought into driving contact with the cog-wheel-driving system by the lever 26, pivoted between the shafts in the bracket 30 and operated by a reversing-bar 27, which is connected to the reversing-lever pivot-shaft by the lever 28, an extension of which, 28$^a$, engages a spring-check 29, secured to the frame to hold either clutch in driving contact. (See Fig. 10.) The reversing-bar 27 is operated by the head 12$^\times$ of a bolt forming a projection at the tail-grip end of the hauling-bar and at the other end by a sleeve-piece 12$^b$, slidably adjustable on the bar. These thus effect the reversal of the motion of the bar at either end of its movement. The shaft 34 of the revolving knife 35 is rotated in its bearings in the bracket 36 by a chain 37 over chain-wheels 38 and 39, so as to give an increased speed to the knife-spindle from the shaft of the gutting-wheel 20. These constitute the operating mechanism, the specific details of which I shall describe in following the progress of the fish throughout the process of cleaning.

The cradle 41, in which the fish are deposited tail first and belly down, as before mentioned, is a simple beveled receptacle adapted to the size of the fish and open at the bottom. The tail is passed by the operator between the gill-levers 55 and is placed in the V of the guide 42, which is pivotally secured to the head-cutting support 43. This tail-guide is adapted in its shape to guide the tail to its desired position with its fluke in a vertical line and is held up in the position drawn (see Fig. 4) by a spring 44 on its pivot-pin. The tail is thus sustained by the guide in the line of the hauling-bar 12, and the end grip is designed to automatically take hold of it to pull it through the machine. This tail-grip (see Figs. 12 and 13) is composed of the gripping members 45, pivoted on the pin 46, within an open slot at the extreme end of the hauling-bar 12. The outward ends are provided with serrations or teeth bent in toward one another, and the ends lying within the slot of the bar are so bent at 45$^a$ 45$^b$ as to project beyond the thickness of the bar and be engaged by the sliding sleeve 47, which by pressing the bent portions 45$^a$ within the width the outward gripping ends are opened, as shown by the full lines in Fig. 13, while by sliding the sleeve to the other extreme, as shown by dot-and-dash lines, the gripping ends are forced together. The sleeve 47 is checked in its movement and prevented from sliding except under the positive strain of the means provided to effect the opening or closing of the grip by a spring 48, which bears against the flat side of the sleeve and not only holds it from sliding, but shields it on that side from direct rubbing contact with the beveled guideway 50, secured to the overhead bracket which sustains the fish-guide rollers and the brushes and is designed to steady and direct the bar while it engages the sleeve-operating device. The sleeve is similarly protected on the other side by a guard 49, secured by a bolt, as shown, in the head of which the spring 48 is inserted. The movement of the sleeve to effect the closure of the grip on the tail of the fish about to pass through the machine is effected by a small forked lever 51, mounted on a shaft 52 in bearings in the bracket 36, such shaft being spring-controlled in its movement in the manner shown, so as not to oppose a solid resistance in sliding the grip-sleeve. At the other end of the machine the grip-sleeve is moved to effect the release of the grip by a tongue 53, adjustably mounted on the top of the bar-guide 13. As the bar draws the fish from the cradle the body passes between the gill-levers 55, which are loosely mounted on the shaft 56, so as to be susceptible of a limited opening movement thereon pivoting on the pins 57, which secure the levers to the shaft. The movement apart of these levers is controlled by the compression-spring 58, situated below the pins 57, and the levers are constrained to move equally on each side of the center by the link 59, attached to each, one above and the other below the pivot-pins 57, while an adjusting-screw 60, threaded into one lever and bearing against the other, enables them to be adjusted in their distance apart to suit the requirements of the fish.

The gill-lever shaft 56 is mounted in bearings 61, secured to the frame of the machine, and the levers are held in an angled position toward the cradle by a spring 62 on a lever 63, secured to the shaft. At the other end of the shaft 56, toward the back of the machine, is a lever 64, adapted to engage a pin 65 on a vertically-slidable rod 66, the upper end of which is bent over and has a downwardly-projecting inclined wedge 66$^a$, designed to pass behind the collar 67$^a$ of a spring-controlled pin 67, which sustains the pawl 68 out of action. This pawl 68 is pivotally mounted on a pin 69 in the knife-lever 72, which is mounted free on the back shaft 8, and alongside of the knife-lever on the same side of it as the pawl is the ratchet-wheel 73, keyed or otherwise secured to the shaft, so that when the pin 65 is withdrawn and the pawl falls into engagement with the teeth of the ratchet-wheel, the weight of the pawl being aided by the coil-spring 76 between the pawl and its pin, the knife-lever is forced down by the rotation of the shaft. The knife-lever is guided by the curved standard 74, which is carried up and around to support by an adjustable screw 75 and spring 76 the weight of the knife-lever and retain it out of action as drawn when not forced down by the pawl. In the path of the pawl toward the lower end of its desired movement is a screw 77, threaded into a projection 74$^a$ of the standard or other convenient attachment. This screw is designed to throw the pawl out of gear with the ratchet-wheel when it falls on it at the adjustable limit of its stroke and allow the knife-lever to be pulled up to its normal position, as shown in Fig. 3, by the spring 76. The blow of the knife to sever the head is delivered while the fish is stretched from the gill-levers and while the shoulder portion is lying in the hollow receptacle 43, and as soon as the head is cut off the sudden release of the tension and backward pull of the spring 62 restores the gill-levers to their normal position and the vertical rod is raised up, allowing the pin 67 to be forced by its spring out under the pawl to sustain it out of action until released by the next fish. As the body of the fish is pulled forward the tail-guide yields downward against the resistance of its spring to allow the body to pass, and the belly of the fish is cut by the revolving knife 35 and the divided portions are opened out by the spreader 80, which is secured to the frame and extends between the knife 35 and the gutting-wheel 20. The desired position of the fish is maintained on the spreader by the rollers 81, shaped to conform approximately to the cross-section of the back of the fish. A pair of these rollers are mounted in each frame 82, slidable in slots 83$^a$ of the frames 83, and the upward slidable movement is inclined forward, so as to allow them to be more easily lifted by the forward movement of the fish. At the center of the frames 82 are stems 82$^a$, which pass through the top of the frame 83 and have attached to them the lower ends of springs 84, adjustably connected by screws 85 to brackets 86. These springs sustain the weight of the slidable roller-brackets and their attached parts. Between the roller-brackets 82 are supported on a flat bar brushes 87, which scrub the outside of the fish and remove the scales, while they also exert a light downward pressure, holding the fish on the spreader while the gutting-wheel 20 removes the viscera, which come freely away, as their principal connection to the body was severed when the head was removed. Beyond the gutting-wheel is a second spreader 88, which holds the split fish open while a spray of water under a high pressure discharged through the opening 88$^a$ from the pipe 89 effectually washes the inside of the fish and frees it from blood and slime, while above this spreader are mounted brushes 90, which scrub the slime and scales from the fish and, as before, hold it down in the desired position on the spreader, sprays of water from the pipe 89$^a$, as before, assisting the work of cleaning the outside. The brushes 90 are arranged to scrub the whole outside surface of the fish and are supported on a light wrought-iron frame 91, pivoted on pins 92 on each side of the frame 83. This frame 91 has a downward bell-crank continuation 91$^a$, which is connected by a rod 93 to the lower end of a short lever 94, secured to one end of the short shaft passing through the bar-guide 13 and having at its other end a lever 95, which projects upward into the path of a longer pin 12$^c$ in the bar. By this means the brushes are drawn down as the fish comes within its reach and are lifted clear of the returning-bar. In order to insure that the lever 95 after being moved over by the passing longer pin shall rise up again to such a position as will engage the same pin during its return, I control the movement of the lever by a spring 96, bearing on a special conformation, (see Fig. 10,) so that after being moved over the spring will bear against the projecting heel 94$^a$ and be forced back a small amount sufficient to bring the end of the lever 95 into the path of the longer pin to be engaged by it during the return movement of the bar. With the operation of these brushes the work of cleaning the fish is completed, and it only remains to cut off the tail and sever the fish from its connection with the machine. During this operation the fish is supported on an extension-bar 88$^b$ from the spreader 88.

The operating mechanism of the tail-cutting knife is identical with that before described for cutting the head; but the knife is brought into action by a trip mechanism. (Illustrated in Fig. 7 and also in Fig. 2.) As there shown, the end of a lever 100, secured to one end of a short shaft 101, projects into the path of the nut which secures the guard of the tail-grip of the slidable hauling-bar 12 in such a manner as to be carried over by it into the position shown by dot-and-dash lines. To the other end of this shaft 101 is secured a downwardly-projecting lever 102, which is connected by the member 103 to the detent on one arm 104 of a bell-crank lever, the other arm 105 of which engages a pin 65 in the rod 66, which effects the withdrawal of the pin sustaining the pawl out of gear. Thus the pushing over of the lever 100 moves in the opposite direction the lever 104, and the vertical rod is pulled down, releasing the pawl and bringing down the knife to sever the tail. As, however, the lever 100 is held over in the knife-release position until the reversal of the bar, it is necessary for me to provide a trip mechanism by which after the knife has descended once the attached mechanism is free to return to its normal position. I attain this end by connecting the upper end of the lever 104 to a spring, by which it is pulled into its normal position and in the attachment of the member 103 to it, providing also a trip connection that will carry the lever over as far as necessary to effect the desired lift of the vertical rod and will thereafter by heeling on the adjustable screw 104ª disengage itself upward and allow the lever 104 to fall back under the tension of the spring, though the disengaging-lever 100 may be still in a position to effect the release of the pawl. Immediately after the knife falls and the tail is cut the tongue 53 by engaging and sliding the sleeve 47 opens the grip members and releases the tail-piece, which falls into a chute provided to be carried away as offal, while the fish falls onto another chute or conveyer to be carried away for such subsequent treatment as may be required.

It will be seen from a careful consideration of the foregoing description that my machine has several important advantages, among which may be enumerated the following: the facility with which the head-knife may be set to cut close up to the neck or otherwise, as may be desired; the cutting off of the head as a first step, which permits the readier removal of the viscera, while the "belly-down" position of the fish during such operation enables the offal to fall clear away. The "tail-first" movement facilitates the removal of the scales, and the liberal spraying with high-pressure water both within and without effectually cuts the slime, washes away the dirt, and completes the cleaning.

Having now particularly described my invention and the manner of its operation, what I claim as new, and desire to be protected in by Letters Patent, is—

1. In a machine for the purpose specified wherein the fish is drawn through the machine by the tail; levers between which the body of the fish is allowed to pass, so shaped as to catch in its gills; means for pressing such levers together; for insuring an equal movement of each; and for adjusting their distances apart; a spring to hold the gill-levers against the pull on the fish; and means whereby the movement of the levers due to the pull of the fish effects the release of the head-cutting knife.

2. In a machine for cleaning fish; a rotatable shaft parallel to the direction of motion of the fish through the machine; a ratchet-wheel secured thereto; a knife pivotally mounted on the shaft adjacent to the ratchet-wheel and designed to fall across the path of the fish through the machine; means for sustaining the knife clear of such path; a pawl pivoted on the knife-arm and designed to fall into gear with the teeth of the ratchet-wheel when desired; whereby the knife may be forced down by the rotation of the shaft; means for sustaining the pawl out of gear with the ratchet-wheels; means for withdrawing such support when desired; and means for throwing the pawl out of gear with the ratchet-wheel at the termination of the downward stroke of the knife.

3. In a machine for cleaning fish, having knives for severing the head and tail, pivotally mounted on an adjacent rotatable shaft, and operated through a pawl by ratchet devices secured to the shaft; a pin pressed through the knife-lever by a spring and having a collar to limit its outward movement; a wedge-shaped member bearing against the collar of the pin and designed, when operated from the gill-levers or tail-grip, to withdraw the sustaining-pin, and allow the pawl to connect the knife-lever to the rotatable ratchet-wheel; an adjustable stop in the path of the pawl designed to throw it out of engagement with the ratchet-wheel; and a spring to sustain the knife-lever when the pawl is out of action.

4. In a fish-cleaning machine having a head-cutting knife pivoted on its operating-shaft, and means for connecting the knife-lever to the shaft in rotation, or sustaining it out of action as required; levers adapted to engage the gills of a fish being drawn through the machine; such levers being torsionally secured on a cross-shaft; means for connecting such shaft to the release mechanism of the knife connection; and means for retaining such release connection inoperative until acted on by the tension of a fish caught by the gills.

5. In a machine for cleaning fish; the combination with a rotating knife, over the upper edge of which the fish is pulled "belly down;" of a spreader designed to open the sides of the split fish, vertically-mounted conoidal rollers adapted to maintain the fish in the desired position and press it down on the spreader, brushes mounted between the rollers, the said rollers and brushes being so mounted as to rise and fall to adapt themselves to the shape and size of the fish, and means for sustaining a portion of the weight of the rollers and brushes and their connected parts.

6. In a machine for the purpose specified, wherein the body of the fish after the removal of the head is drawn belly down over a splitting-knife and sustained and pressed down on a spreader; a further spreader in alinement with the first; a rotatable wheel in the interval between the two spreaders, having a series of blades shaped to conform approximately to the cross-section of the spreaders and adapted to remove the viscera from the fish as it is drawn past; brushes for scrubbing the exterior of the fish as it is stretched on the spreader; and water-pipes to deliver a spray through the ridge of the second spreader and between the exterior brushes.

7. In a machine for the purpose specified, the combination with a rotatable splitting-knife and spreaders, and means for pulling fish thereover; of brushes adapted to scrub the exterior of the fish, such brushes being secured on a light resilient frame pivotally mounted so as to be susceptible of being moved to bring the brushes into contact with a fish as it passes beneath them and to lift them thereafter; and perforated pipes designed to spray water on the outside and inside of a passing fish.

8. In a fish-cleaning machine having a slidable bar by which the fish is pulled through the machine; a projecting pin on such bar designed to engage the end of a lever secured to a short shaft pivotally mounted adjacent to it; a second lever secured to the same shaft; a spring bearing on flattened projections or heels on this lever, designed to return the first-named lever to the path of the actuating projecting pin of the bar; and means for connecting this lever system to the pivoted brush-frame, whereby the brushes may be lifted clear of the bar as soon as the fish has passed them, and brought down again as soon as the grip of the bar has passed them during the back stroke.

9. In a machine for cleaning fish, having a tail-cutting-knife mechanism which is sustained out of gear by a slidable pin beneath, and a wedge member for withdrawing such sustaining-pin; a means for operating this wedge member from a projection on the pulling-bar by a system of levers; and a trip mechanism and spring whereby after moving the wedge member to effect the release of the pawl, and consequent action of the knife, the said wedge is restored to its normal position.

10. In a fish-cleaning machine, an operative mechanism consisting of a first-motion shaft across the head of the machine; a knife-operating shaft at right angles thereto, and driven by suitable gear therefrom; a cross-shaft adjacent and parallel to the first-motion shaft, and driven from it by suitable gear at a lower rate of speed; a fish-pulling bar down the center of the machine parallel to the knife-shaft and slidable in suitable bearings in the head-frame; a cog-wheel loose on the first-motion shaft and connected by driving-gear to a loose sleeve on the parallel shaft, both cog-wheels and sleeve having clutch-faces to correspond with adjacent clutches, slidable on feather-keys on each shaft; a centrally-pivoted lever embracing both clutches, and operated from a slidable reversing-bar adjacent and parallel to the hauling-bar; such reversing-bar designed to be operated by projections on the hauling-bar, whereby either clutch may be brought into action, and the cog-wheel be either driven direct by the first-motion shaft, as during the return stroke, or through the loose sleeve-gear from the slower-running shaft.

In testimony whereof I have signed my name to this specification in the presence of two subscribing witnesses.

JOHN KELLINGTON.

Witnesses:
CHAS. C. MATHEWS,
GUS HENSLER.